United States Patent [19]

Dymon

[11] 4,455,694
[45] Jun. 26, 1984

[54] CLIP-ON ATTACHMENT FOR CONSERVING WATER DURING THE FLUSHING OF A TOILET

[76] Inventor: Thaddeus S. Dymon, 13 Fairway Dr., Ludlow, Mass. 01056

[21] Appl. No.: 399,742

[22] Filed: Jul. 19, 1982

[51] Int. Cl.³ .............................................. E03D 1/14
[52] U.S. Cl. ......................................... 4/325; 4/393; 4/415
[58] Field of Search ............... 4/324, 325, 382, 392, 4/393, 395, 415

[56] References Cited

U.S. PATENT DOCUMENTS

| | | | |
|---|---|---|---|
| 2,001,390 | 5/1935 | Lester | 4/325 |
| 2,526,294 | 10/1950 | Stegeman | 4/325 |
| 3,561,016 | 2/1971 | Reynolds | 4/324 |
| 4,032,997 | 7/1977 | Phripp et al. | 4/DIG. 1 |
| 4,038,708 | 8/1977 | Perrine et al. | 4/325 |
| 4,160,294 | 7/1979 | Crumby | 4/324 |
| 4,216,555 | 3/1978 | Detjen | 4/324 |
| 4,224,703 | 9/1980 | Makhobey | 4/324 |
| 4,232,408 | 11/1980 | Chen-Yuan | 4/325 |

Primary Examiner—Charles E. Phillips
Attorney, Agent, or Firm—Donald S. Holland

[57] ABSTRACT

A clip-on attachment is disclosed by which an unskilled homeowner can easily transform his existing toilet or a new one into a water-saving device wherein either a total or partial flush can be selected at the option of a user. In the preferred embodiment, the attachment comprises a force-down wire which can be easily clipped onto any standard flapper flush valve, a lever arm having a lower end portion which can pivot against the wire to prematurely force the valve to close, a weighted float attached to the top of the lever arm near the full water line of the tank, and a latch to selectively prevent or allow the float to drop with the upper level of water in the tank during flushing of the toilet.

If a user decides that a partial flush is sufficient to evacuate the bowl, the latch is positioned to allow the float to freely drop with the water level. As the float drops, the lever arm pivots and forces the valve to prematurely close before the tank is completely emptied.

If the user decides that a total flush is needed, he merely switches the latch to a position where it engages the lever arm and prevents the float from dropping with the water. When the float movement is restricted, the tank operates as if the clip-on attachment is not there and completes a full flush.

13 Claims, 9 Drawing Figures

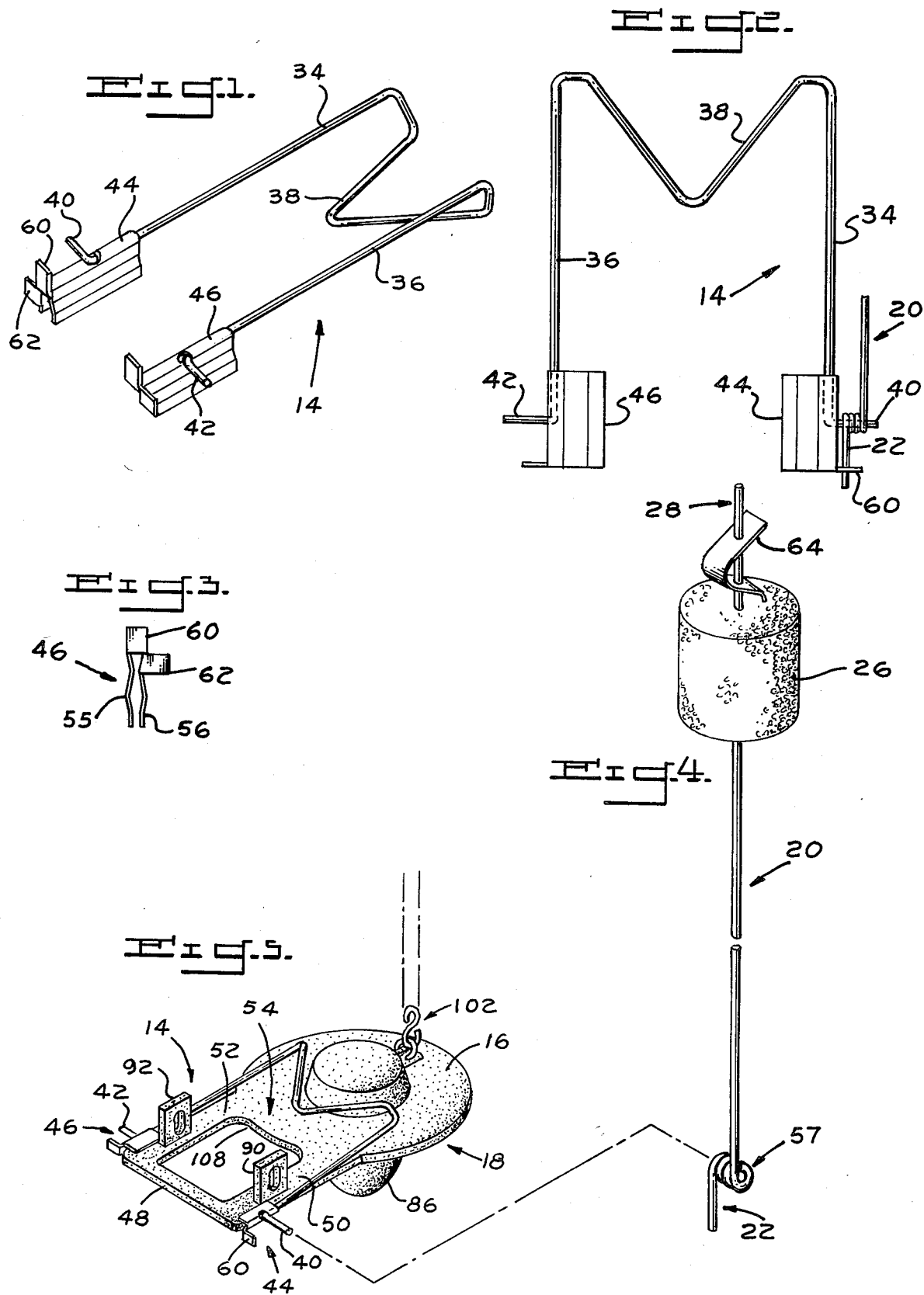

CLIP-ON ATTACHMENT FOR CONSERVING WATER DURING THE FLUSHING OF A TOILET

BACKGROUND OF THE INVENTION

The present invention relates to conventional toilet flush tanks and more particularly relates to devices placed inside such tanks to conserve the amount of water used during flushing.

In conventional flush tank constructions, the tank is designed to normally hold and release the maximum amount of water needed to evacuate the toilet under all circumstances. However, in most situations, the bowl is only slightly filled with either waste or urine and the amount of water used during flushing is excessive. A substantially smaller quantity of water would normally suffice to evacuate the bowl.

This traditional design of using the maximum amount of water stems from an era in which water was readily and cheaply available. Currently, however, certain densely populated areas or municipalities are experiencing water shortages, and others are forecasting such fates. Still others are raising the cost of water service to the public in order to increase their tax revenue.

Clearly, it would be advantageous if a simple accessory could be invented to transform standard toilets into water-saving systems wherein the accessory would enable the toilet user to easily select a full flush or partial flush of the bowl.

One problem with the needed accessory is that it has to be simple. The average homeowner is often unskilled with his hands and has a mental block against working with any device that is not the simplest of devices.

Recently, inventors have produced control devices for toilet tanks which enable a commode user to selectively release different amounts of water for flushing. Typically, the selection is achieved through utilization of means which prematurely force a buoyant outlet valve to close before the tank is completely emptied. While these known devices have been satisfactory to a limited degree, they have generally exhibited certain deficiencies which have inhibited their widespread acceptance. Primarily, they have been generally complex structures which are expensive to manufacture and difficult to retrofit onto existing commode constructions. Further, they are often built for one particular type of closure valve and are not adaptable to fit all of the various closure valves used in commode configurations.

Accordingly, it is the principal object of this invention to provide a simple clip-on attachment for toilet tanks by which even an unskilled homeowner can easily and quickly convert his toilet to a water-saving device.

It is a more specific object to provide an easy-to-install attachment which will enable a commode user to selectively choose either a full or partial flush of his toilet.

It is another object to provide a clip-on attachment which will fit or can be readily adapted to fit most, if not all, of the various types of flush tank systems.

It is a still further object to provide a clip-on attachment which can be retrofitted to toilets already in use or can be fitted to new toilets.

It is yet another object to provide a clip-on attachment, commensurate with the above-listed objects, which is simple and economical in design, yet durable and highly reliable to use.

The above and other objects and advantages of this invention will become more readily apparent when the following description is read in conjunction with the accompanying drawings.

BRIEF DESCRIPTION OF THE DRAWINGS

FIG. 1 is a perspective view of a force-down wire constructed in accordance with the present invention, wherein the wire can be clipped onto a flapper valve for prematurely closing the valve during a flushing operation;

FIG. 2 is a bottom plan view of the FIG. 1 attachment with two end clips rotated 90° from their FIG. 1 positions;

FIG. 3 is an end plan view of the right-hand clip of FIG. 1;

FIG. 4 is an elevational view of a lever arm for actuating the force-down wire, wherein the top of the arm has an attached, weighted float;

FIG. 5 is a perspective view of the force-down wire clipped onto a standard flapper flush valve, wherein the view also includes a broken line for showing where the lever arm is attached to the wire when the unit is assembled;

DETAILED DESCRIPTION OF THE PREFERRED EMBODIMENTS

Figure 6:
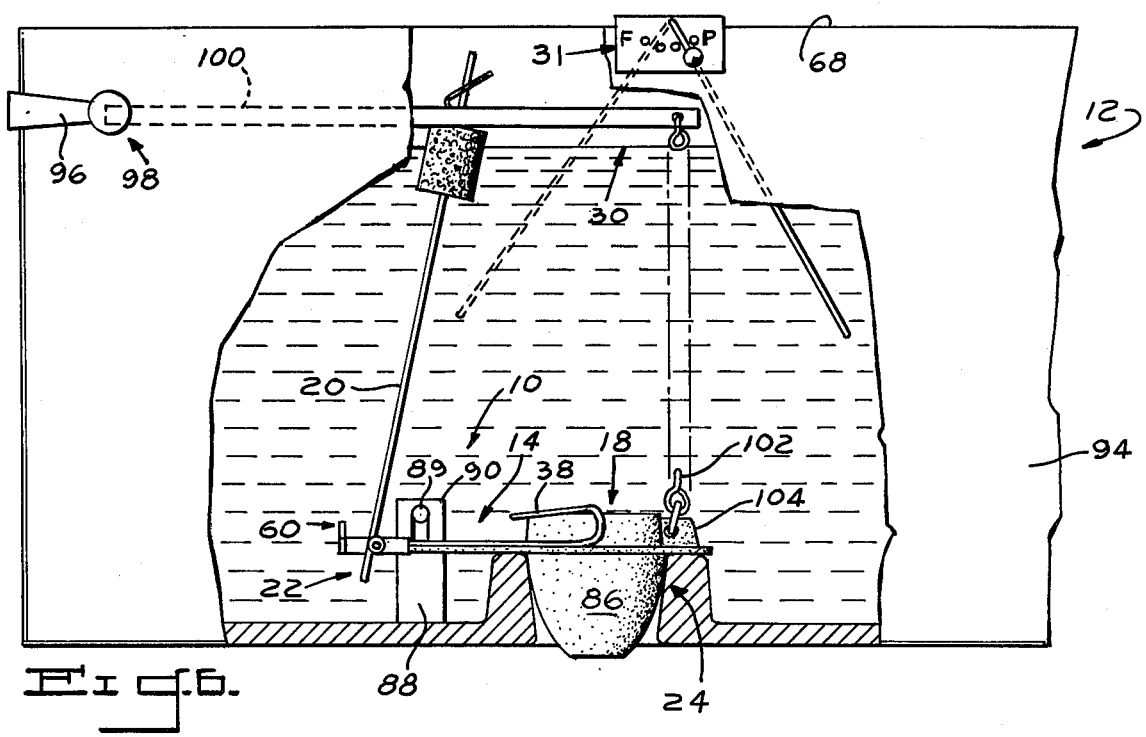
FIG. 6 is an elevational view of the preferred embodiment of the present invention attached to a standard flush toilet tank, wherein the tank is filled with water prior to flushing.
Figure 7:
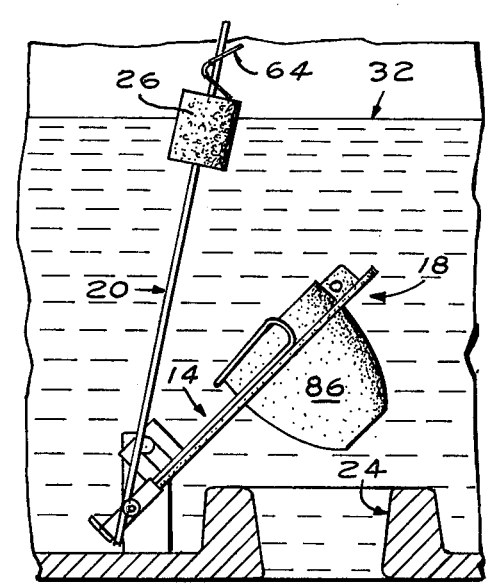
FIG. 7 is a fragmentary elevational view of the FIG. 6 system after a flushing operation has begun and the level of water in the tank has started to drop.
Figure 8:
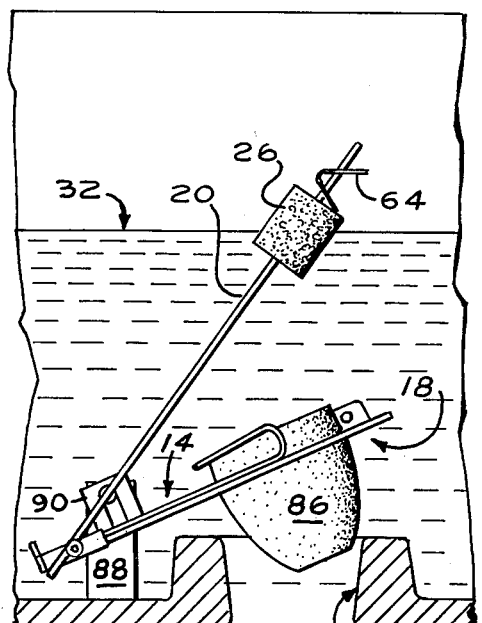
FIG. 8 is a view of the FIG. 7 components after the water level has slightly dropped an additional amount and shows the present invention forcing a premature closing of the flapper valve to prevent the tank from completely emptying; and, FIG. 9 is a perspective view of a latch shown in FIG. 6 which is used to select either a partial or total flush of the FIG. 6 tank.
Figure 9:
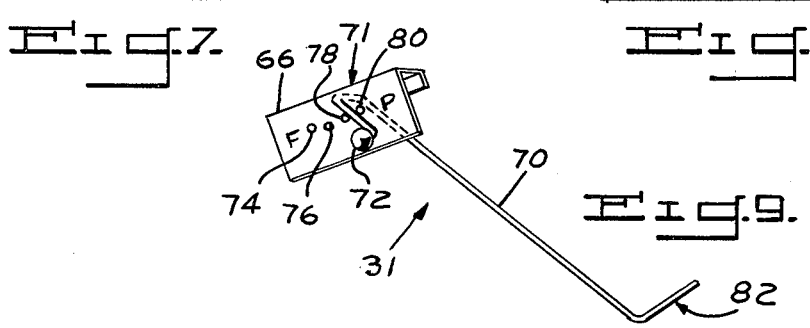

Referring now to the drawings, a clip-on attachment 10 is shown for conserving the amount of water used by a standard toilet flush tank 12 (see FIG. 6 for the attachment in its entirety). In the preferred embodiment, the attachment 10 comprises a force-down member or wire 14 which can be easily clipped onto the top 16 of any standard flapper flush valve (such as the valve 18 shown in FIGS. 5-8) to selectively vary the amount of water discharged by the tank 12 during flushing of the toilet. It further includes a lever arm or actuating arm 20 having a lower end portion 22 which can pivot against the force-down wire to prematurely force the valve 18 to close on tank outlet 24, a weighted float 26 attached to the other end or top 28 of the lever arm near the "full" water line 30 of the tank 12, and a latch 31 to selectively vary the amount of water discharged during the flushing of the toilet by restricting or allowing movement of the float and the attached lever arm relative to the upper level 32 of the water in the tank which drops during flushing of the toilet.

The force-down wire 14 is preferably made of brass wire, but can be made of any other suitable non-corrosive material such as plastic. As best shown in FIGS. 1–3, the force-down wire basically comprises an open M-shaped configuration having a pair of parallel arms 34, 36 which are interconnected at one of their ends by an integral, angularly offset, V-shaped portion 38. The arms 34, 36 also have oppositely outturned, free ends 40, 42 which act as trunnion pins upon which the actuating arm or lever arm 20 can be rotatably mounted.

Further, the force-down wire 14 includes a pair of open-ended, rotatable clips 44, 46 which overlie and extend beyond the free ends 40, 42. These clips enable the force-down wire 14 to be securely fastened atop any standard flapper flush valve. They are preferably made of brass, but can, of course, be made of any other suitable non-corrosive material such as plastic.

In order to attach the wire 14 to a flexible rubber flapper valve of the type shown in FIG. 5, the clips 44, 46 to their positions shown in FIG. 2. The open-ended clips are then slipped over the flapper free end 48 and onto the marginal side edges 50, 52 of the flat section or flap 54 of valve 18. Because of the resilient nature of the clips and the close configuration of their top and bottom walls 55, 56 shown in FIG. 3, the clips first expand when they are slipped onto the valve flap 54. Then, the resilience of the clips cause the top and bottom walls to grab the flap 54 and hold the force-down wire 14 securely in place.

The rotatability aspect of the end clips 44, 46 enable the wire to be attached to other flapper valves as well as the illustrated, representative valve 18. Though not shown, the other types include vertical upstanding side walls along the marginal side edges 50, 52 of their flaps 54. In those types of configurations, the end clips 44, 46 of wire 14 are rotated to their FIG. 1 positions so that they can be easily attached to the upstanding side walls. It should be noted that when the wire is attached to the upstanding-side-wall valve, it is flipped over from its position shown in FIGS. 5–8.

Referring now to FIG. 4, the lever arm or actuating arm 20 is an elongated member made of brass wire or any other strong, non-corrosive material such as plastic. It includes a coiled mid-portion 57 which can be slipped onto either of the trunnion pins 40, 42 so that the lever arm can be rotatably connected to the force-down wire. As used herein, the term "mid-portion of arm 20" refers to any portion along the length of arm 20 between the arm's opposite ends.

The lever arm 20 further includes the lower end section or drive arm 22 which can pivot against an outturned portion or projection 60 of the adjacent clip 44 or 46 (see FIG. 2) to engage the force-down wire 14. It should be understood that the same type of engagement will occur when the wire is attached to a flapper valve in which the end clips are vertically oriented on upstanding side walls. In that arrangement, the outturned portion which is engaged by the lever arm 20 will be outturned portion 62, which is radially offset 90° from the outturned portion 60 (see FIGS. 1 and 3).

Referring to FIG. 4, the weighted float 26 is telescopically fit onto the upper end portion 28 and includes a releasable leaf spring or spring clip 64 for adjusting the position of the float along the lever arm 20. In the preferred embodiment, the applicant has found that a weight of 1½ oz. will be sufficient for the float 26 and the attached lever arm 20 to produce enough "inch-pounds", or a moment of force, to overcome the natural buoyancy of the flapper valve and cause it to prematurely close during a flushing operation.

There are several types of latches which can be used to control movement of the float relative to the upper level of water 32 in a tank 12. The illustrated latch 31 is but one type and includes an L-shaped mount 66 which hooks or slips over the rim 68 of any standard tank 12 to hold the latch securely in place. The latch further includes a non-corrosive, somewhat Z-shaped, wire 70 which is pivotally attached to the mount 66 by an upper wire portion which fits through an aperture in the mount at 71. The upper wire portion has a handle 73 which can be flipped to either a full flush position "F" on the mount where it is held between two detents 74, 76 or to a partial flush position "P" between two detents 78, 80. When the handle is pivoted to the partial flush position, the lower end 82 of the latch wire 70 is pivoted away from the lever arm 20 and then kept in place by the detents 78, 80 "holding" the handle so that the latch will not engage the lever arm during a flushing operation of the toilet. When the handle is pivoted to the full flush position, the latch end 82 is pivoted near the upper mid-portion of the lever arm and then kept in place by the detents 74, 76 so that it will engage the upper mid-portion of the lever arm during a flushing operation and prevent the lever arm and attached float from dropping with the upper level 32 of water in the tank 12.

As shown in FIG. 6, a typical toilet flush tank 12 has its flush outlet 24 normally closed by a flush ball 86 of the flapper valve 18. The illustrated flapper valve is pivotally mounted on a post 88 near the bottom of tank 12 by a hinge pin 89 that passes through the post and a pair of upstanding ears or hinge portions 90, 92 on top of the resilient, flexible flap 54.

Near the top of its side 94, the tank 12 is provided with a conventional flush handle 96 mounted on a pivot 98 from which a conventional flush bar or lever 100 extends inside of the tank. The end of the bar 100 is provided with a chain or similar link 102 which connects with a suitable bracket 104 to the flush ball 86. When the handle 96 is depressed, the bar 100 lifts the link 102 to unseat the flush ball 86 and allows water in the tank to flush through the outlet 24.

The flush ball 86 is buoyant. Accordingly, as soon as it is unseated, its buoyancy will cause it to rise as far as it can, restricted only by the connection of flap 54 to the post 88. Accordingly, the flapper flush valve 18 remains open until the upper liquid level 32 in the tank 12 drops low enough with respect to the ball 86 so that gravity, any resilient bias on the flap 54, and water discharge pressure will restore the ball to its seat 24. Water entering the tank will then fill the tank through a conventional tank standpipe (not shown).

In certain circumstances, such as when a toilet bowl is only slightly filled with urine or feces and urine, it is not necessary to use the full amount of water in the tank to evacuate the bowl. Those are the types of instances for which the present invention is ideal.

To attach this invention to the existing tank shown in FIG. 6, the flapper valve 18 is removed from the tank by detaching the hinge pin 89 and lifting the valve off of the mounting post 88. After the valve's removal from the tank, the force-down wire 14 is clipped onto the valve, the lever arm 20 is slipped onto the trunnion pin 40, and the free end of the pin is slightly upturned with a pair of pliers to insure that the lever arm will not slip off the pin. The flapper valve 18 is then refitted in the tank 12 by slipping the flap 54 over the post 88 so that the post 88 extends upwardly through a central aperture 108 in the flap. The hinge pin 89 is then reinserted through the upstanding hinge portions 90, 92 and the hole in the post to hold the flapper valve and the clip-on attachment 10 securely in place.

Next, the position of the float 26 is adjusted on the arm 20 to select the amount of water that will be discharged by the toilet tank during a partial flushing operation. This amount can be varied by lowering or raising the position of the float on the lever arm 20.

Finally, the latch 31 is slipped onto the rim 68 of the tank 12, the tank cover (not shown) is replaced and the system is ready to use.

If a user decides that a partial flush is sufficient to evacuate the toilet bowl, e.g., when there is only urine in the bowl, the latch 31 is switched to its partial flush of "P" position to allow the float 26 to freely drop with the upper water level 32 in the tank 12 during the flushing of the toilet. As the float drops, the lever arm 20 pivots on the trunnion pin 40 and the lower end 22 of the arm engages the force-down wire 14 (see FIG. 7). Continued dropping of the float causes the lever arm to pivot further and force the wire against the attached flapper valve 18 and prematurely force the valve to seat on the tank's outlet 24. This stops the outflow of the water and prevent needless wastage of the remaining water in the tank.

If the user decides that a total flush is needed, he merely switches the latch to its full flush or "F" position where it engages the lever arm 20 and prevents the float 26 from dropping with the water. When the float movement is restricted, the lower end of the lever arm 20 is not able to pivot against the force-down wire and prematurely close the flapper valve. Thus, the flapper valve is able to operate as if the force-down wire 14 is not there, and the tank is permitted to complete a standard full flush.

During fitting of the invention to the homeowner's particular tank, there may be an insufficient amount of room between the tank side 94 and the trunnion pin 40. If that occurs, the homeowner merely shortens the pin 40 by snipping it and then places the coiled mid-portion 57 of the lever arm 20 on the opposite side of the wire 14 on trunnion pin 42.

It should be understood that the present invention 10 can be employed to select a partial or total flush of tanks that use vertically movable flush float valves instead of pivotable flapper valves. In those types of tank configurations, the force-down wire can be clipped onto the base of an L-shaped wire (not shown) that is suspended inside of the particular tank. The wire 14 is positioned slightly above the float valve and is pivotally mounted on the unshown suspended wire. When the water level in the tank drops during a flushing operation, the lever arm 20 acts just as it did before and pivots against the wire 14. The wire then moves through the water and its offset portion 38 engages the float valve to cause it to prematurely close.

While different embodiments of the present invention have been expressly disclosed, it should be understood that obvious structural modifications can be made without departing from the spirit of the invention. Accordingly, reference should be made primarily to the accompanying claims, rather than to the specification, to determine the scope of the invention.

Having thus described the invention what is claimed is:

1. Apparatus for transforming a standard flush toilet into a water-saving device wherein either a total or partial flush of the toilet can be selected at the option of a user, said apparatus comprising:
    (a) a force-down member having attachment means for fastening the member onto the top of a pivotable flapper outlet valve inside a toilet flush tank said force-down member having a trunnion pin and a projection extending therefrom;
    (b) a lever arm having a mid-portion which is rotatably connected to said trunnion pin on the force-down member and an end portion which projects between said pin and said projection and is pivotable against said projection of the force-down member to cause the member to force the valve to prematurely seat during a flushing operation;
    (c) a weighted float attached to an opposite end portion of the lever arm near the upper water line of the tank, wherein the float is adapted in weight to be capable of dropping with said upper water level during a flushing operation and cause the attached lever arm to pivot against the force-down member and force the flapper valve to prematurely close and stop further outflow of water from the tank during a flushing operation; and,
    (d) latch means mountable on said tank to selectively effect a partial or total flush of the toilet by allowing or preventing movement of the float and its attached lever arm relative to the upper level of the water in the tank during the flushing of the toilet whereby upon allowance of said movement said end portion will pivot about said trunnion and contact said projection to prematurely close said valve to effectuate a partial flush of the tank contents.

2. The apparatus of claim 1 wherein the force-down member comprises a substantially M-shaped, non-corrosive wire having a pair of parallel arms and a V-shaped, angularly offset portion.

3. The apparatus of claim 1 wherein the attachment means comprises a pair of clips, whereby the clips can be slipped onto a flat flap of the flapper valve to hold the force-down member securely in place.

4. The apparatus of claim 3 wherein the clips are rotatable 90° so that the force-down member can be attached to flapper flush valves having upstanding side walls along their marginal side edges.

5. The apparatus of claim 1 wherein the float includes a leaf spring to selectively adjust the position of the float along the lever arm and thereby adjust the amount of water discharged by the tank during a partial flushing of the toilet.

6. The apparatus of claim 1 wherein the latch means includes a generally Z-shaped wire which is pivotally connected to a mounting slip attached to the upper rim of the toilet tank, whereby the wire is suspended inside of the tank and can be pivoted to a full flush position where the lower wire portion engages the lever arm and prevents the float and attached arm from dropping with the water.

7. A clip-on attachment for conserving water during the flushing of a toilet, said attachment comprising:
    (a) a force-down member having clip means for securing the member onto the top of a pivotable flapper outlet valve inside a toilet flush tank said force-down member having a trunnion pin and a projection extending therefrom;
    (b) a lever arm having a mid-portion which is rotatably connected to said trunnion pin on the force-down member and an end Portion which projects between said pin and said projection and is pivotable against said projection of the force-down member;

(c) a weighted float attached to an opposite end portion of the lever arm near the upper water line of the tank; and, (d) latch means mountable on said tank to selectively effect a partial or total flush of the toilet by allowing or preventing movement of the float and the attached lever arm relative to the upper level of the water in the tank during the flushing of the toilet, whereby upon allowance of said movement said end portion will pivot about said trunnion and contact said projection to prematurely close said valve to effectuate a partial flush of the tank contents.

8. The clip-on attachment of claim 7 wherein the forcedown member comprises a substantially M-shaped, non-corrosive wire having a pair of parallel arms and a V-shaped, angularly offset portion.

9. The clip-on attachment of claim 8 wherein the clip means comprises a pair of clips attached to the parallel arms, whereby the clips can be slipped onto a flat flap of the flapper valve to hold the force-down member securely in place.

10. The clip-on attachment of claim 9 wherein the clips are rotatable 90° so that the force-down member can be attached to flapper flush valves having upstanding side walls along their marginal side edges.

11. The clip-on attachment of claim 7 wherein the float includes a leaf spring to selectively adjust the position of the float along the lever arm and thereby adjust the amount of water discharged by the tank during a partial flushing of the toilet.

12. The clip-on attachment of claim 7 wherein the latch means includes a generally Z-shaped wire which is pivotally connected to a mounting clip attached to the upper rim of the toilet tank, whereby the wire is suspended inside of the tank and can be pivoted to a full flush position where the lower wire portion engages the lever arm and prevents the float and attached arm from dropping with the water.

13. A method of selectively effecting either a partial or full flush of a toilet at the option of a user, said method comprising:

(a) attaching a force-down member on top of a flapper flush valve inside the toilet's tank;

(b) connecting a mid-portion of a lever arm onto a trunnion pin of the force-down member so that an end portion of the arm can pivot against a projection on the force-down member;

(c) securing a weighted float to an opposite end portion of the lever arm near the upper water level of the tank, whereby the float is adapted to drop with the upper water level during a flushing of the toilet and cause the attached lever arm to pivot against a projection on the force-down member to force the flapper valve to prematurely close on the toilet's outlet and thereby prevent further water from discharging from the tank;

(d) suspending a pivotable latch inside of the tank which is capable of being positioned to engage the lever arm and prevent the attached float from dropping with the water during a flushing operation and is also capable of being positioned away from the lever arm to permit the float and attached arm to drop with the water during a flushing operation;

(e) initiating a flushing operation of the toilet by depressing the toilet's flush handle;

(f) when a partial flush is desired, switching the latch to a position away from the float where it permits the float to drop with the upper level of water in the tank until the attached lever arm pivots against the projection on the force-down member;

(g) continuing dropping of the float with the water so that the lever arm pivots against the projection and causes the flapper valve to prematurely seat on the tank's outlet and prevent the tank from being completely emptied; and (h) when a total flush is desired, switching the latch to a position where it prevents the float and attached lever arm from dropping with the water so that the lever arm is not able to Pivot against the force-down member and prematurely close the flapper valve, thus allowing the tank to complete a standard full flush.

* * * * *